(12) United States Patent
Dye et al.

(10) Patent No.: US 8,533,670 B2
(45) Date of Patent: *Sep. 10, 2013

(54) GRAPHICAL PROGRAMMING SYSTEM WITH BLOCK DIAGRAM EXECUTION AND DISTRIBUTED USER INTERFACE DISPLAY

(75) Inventors: Robert E. Dye, Austin, TX (US); Darshan Shah, Round Rock, TX (US); Steve Rogers, Austin, TX (US); Greg Richardson, Round Rock, TX (US); Dean A. Luick, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1915 days.

This patent is subject to a terminal disclaimer.

(21) Appl. No.: 10/772,518

(22) Filed: Feb. 5, 2004

(65) Prior Publication Data

US 2004/0158812 A1    Aug. 12, 2004

Related U.S. Application Data

(63) Continuation of application No. 09/617,600, filed on Jun. 13, 2000, now Pat. No. 6,802,053.

(60) Provisional application No. 60/149,950, filed on Aug. 19, 1999.

(51) Int. Cl.
*G06F 9/44* (2006.01)
*G06F 15/16* (2006.01)
*G06F 3/00* (2006.01)

(52) U.S. Cl.
USPC ........... 717/113; 717/110; 717/124; 709/201; 709/203; 715/733; 715/740

(58) Field of Classification Search
USPC ......... 717/104–113; 709/201–203; 715/733, 715/740
See application file for complete search history.

(56) References Cited

U.S. PATENT DOCUMENTS

| 4,827,404 A | 5/1989 | Barstow et al. |
| 4,849,880 A | 7/1989 | Bhaskar et al. |

(Continued)

FOREIGN PATENT DOCUMENTS

| EP | 0 367 709 | 5/1990 |
| EP | 0 398 646 | 11/1990 |

(Continued)

OTHER PUBLICATIONS

Ross et al., "The design and programming of a display interface system integrating multi-access and satellite computers," 1967, ACM, p. 1-14.*

(Continued)

*Primary Examiner* — Qing Chen
(74) *Attorney, Agent, or Firm* — Meyertons Hood Kivlin Kowert & Goetzel, P.C.; Jeffrey C. Hood

(57) ABSTRACT

System and method for executing a graphical program on a first computer and providing a user interface of the graphical program on a second computer, where the graphical program includes a plurality of interconnected function icons representing graphical data flow of a function. Information indicating a plurality of graphical programs on the first computer, e.g., a list, may be displayed on the second computer, and user input specifying the graphical program on the first computer received to the second computer, e.g., selecting the graphical program from the list of graphical programs. The graphical program is executed on the first computer, and information describing the user interface of the graphical program is provided to the second computer during execution. The user interface of the graphical program is displayed on the second computer, facilitating interaction between a user of the second computer and the graphical program executing on the first computer.

46 Claims, 10 Drawing Sheets

(56) References Cited

U.S. PATENT DOCUMENTS

| | | | |
|---|---|---|---|
| 4,901,221 A * | 2/1990 | Kodosky et al. | 715/771 |
| 5,109,504 A | 4/1992 | Littleton | |
| 5,261,043 A * | 11/1993 | Wolber et al. | 715/809 |
| 5,283,861 A * | 2/1994 | Dangler et al. | 715/740 |
| 5,309,556 A | 5/1994 | Sismilich | |
| 5,377,318 A | 12/1994 | Wolber | |
| 5,437,464 A | 8/1995 | Terasima et al. | |
| 5,481,740 A | 1/1996 | Kodosky | |
| 5,481,741 A * | 1/1996 | McKaskle et al. | 345/522 |
| 5,497,498 A | 3/1996 | Taylor | |
| 5,535,342 A | 7/1996 | Taylor | |
| 5,541,849 A | 7/1996 | Rostoker et al. | |
| 5,544,320 A * | 8/1996 | Konrad | 709/203 |
| 5,555,201 A | 9/1996 | Dangelo et al. | |
| 5,566,295 A | 10/1996 | Cypher et al. | |
| 5,583,749 A | 12/1996 | Tredennick et al. | |
| 5,603,043 A | 2/1997 | Taylor et al. | |
| 5,638,299 A | 6/1997 | Miller | |
| 5,652,875 A | 7/1997 | Taylor | |
| 5,652,909 A | 7/1997 | Kodosky | |
| 5,684,980 A | 11/1997 | Casselman | |
| 5,724,074 A | 3/1998 | Chainani et al. | |
| 5,732,277 A | 3/1998 | Kodosky et al. | |
| 5,737,235 A | 4/1998 | Kean et al. | |
| 5,760,788 A | 6/1998 | Chainini et al. | |
| 5,784,275 A | 7/1998 | Sojoodi et al. | |
| 5,801,689 A * | 9/1998 | Huntsman | 715/733 |
| 5,949,412 A * | 9/1999 | Huntsman | 715/740 |
| 6,020,881 A * | 2/2000 | Naughton et al. | 715/740 |
| 6,064,409 A | 5/2000 | Thomsen et al. | |
| 6,102,965 A * | 8/2000 | Dye et al. | 717/109 |
| 6,138,150 A * | 10/2000 | Nichols et al. | 709/219 |
| 6,173,438 B1 | 1/2001 | Kodosky et al. | |
| 6,219,628 B1 | 4/2001 | Kodosky et al. | |
| 6,226,776 B1 | 5/2001 | Panhchul et al. | |
| 6,230,307 B1 | 5/2001 | Davis et al. | |
| 6,313,851 B1 * | 11/2001 | Matthews et al. | 715/718 |

FOREIGN PATENT DOCUMENTS

| | | |
|---|---|---|
| EP | 0 426 909 | 5/1991 |
| WO | WO 94 10627 A | 5/1994 |
| WO | WO 94 15311 A | 7/1994 |
| WO | 96 14618 | 5/1996 |

OTHER PUBLICATIONS

Moulton et al., "Remote programmability of graphic interactions in a host/satellite configuration," 1976, ACM, p. 204-211.*

Theimer et al., "Preemptable Remote Execution Facilities for the V-System," 1985, ACM, p. 2-12.*

Swenson, Keith D., "Visual Support for Reengineering Work Processes," Nov. 1993, Proceedings of the Conference on Organizational Computing Systems, p. 1-12.*

Myers, Brad A., "User Interface Software Tools," Mar. 1995, ACM, p. 64-103.*

De Coster, Grape-II: An Introduction [online]. Automatic Control and Computer Architectures Department. Katholieke Universiteit Leuven, Belgium, Feb. 22, 1996 [retrieved Oct. 6, 1999] Retrieved from the Internet @ http://www.esat.kuleuven.ac.be/acca.

Collamati et al. "Induction Machine stator Fault On-line Diagnosis Based on LabVIEW Environment", Mediterranean Electrotechnical Conference, vol. 1, p. 495-498, May 1996.

Spoelder et al., "Virtual Instrumentation: A Survey of Standards and Their Interrelation", Proc. IEEE Instr. and Measurement Tech. Conf., vol. 1, pp. 676-681, May 1997.

Srinivasan et al., "LabVIEW program Design for On-Line Data Acquisition and Predictive Maintenance", Proc. of the 30th Southeastern Symp. on System Theory, pp. 520-524, Mar. 1998.

Wahidanabanu et al., "Virtual Instrumentation with Graphical Programming for Enhanced Detection and Monitoring of Partial Discharges", Proc. Electrical Insulation Conf. 1997, pp. 291-296, Sep. 1997.

Choosing Block-Diagram Tools for DSP Design, http://www.bdti.com/articles/info_dspmt95blockdiagram.htm, May 9, 2003, pp. 1-7.

Real-Time Workshop for Use with Simulink, User's Guide, May 1994, 229 pages.

Guide to Rapid Prototyping with Simulink, Real-Time Workshop and dSPACE, 1995, 16 pages.

Real-Time Interface to Simulink, RTI 30, User's Guide, 1995, 125 pages.

Kevin J Gorman and Kourosh J. Rahnamai, "Real-Time Data Acquisition and Controls Using MatLAB", 1995, 4 pages.

SPW—MatLAB Co-Simulation Interface Product Data Sheet, 1996, 2 pages.

Signal Processing WorkSystem, MatLAB Interface User's Guide, Oct. 1995, 72 pages.

Alta Group of Cadence Design Systems, Inc., 1995, 34 pages.

Code Generation System Product Data Sheet, 1994, 8 pages.

SPW/CGS Porting Kits Product Data Sheet, Nov. 1994, 2 pages.

MultiProx for SPW Product Data Sheet, Aug. 1994, 4 pages.

DSP ProCoder for SPW Product Data Sheet, Nov. 1994, 4 pages.

Xanalog Corporation Sales Manual, Jan. 1987, 8 pages.

Available XA-1000 Literature and Its Use, 1986, 2 pages.

Xanalog, XA-1000 Programming ICONS, 1986, 26 pages.

Xanalog's CAE System: The Fastest AT Alive, Mass High Tech, vol. 4, No. 22, Aug. 1988, 1 page.

Xanalog The Computer Aided Engineering Workstation Comes to Simulation, Simulation vol. 47, No. 1, Jul. 1986, 3 pages.

Xanalog RT Real Time Analog and Digital I/O, Oct. 1990, 4 pages.

Xanalog/SC+, Sep. 1990, 4 pages.

Xanalog Specializing in Workstations for Continuous Dynamic Simulation, 1987, 24 pages.

Xanalog Real—Time User Guide, 1994, 28 pages.

Lee et al., "Gabriel: A Design Environment for Programmable DSPs", Nov. 7, 1988, 13 pages.

Lee et al., "A Design Tool for Hardware and Software for Multiprocessor DSP Systems", May 1989, 4 pages.

Gabriel 0.7 Overview, 1990, 5 pages.

Joseph T. Buck and Edward A. Lee, "Scheduling Dynamic Dataflow Graphs with Bounded Memory Using the Token Flow Model", http://www.synopsys.com/, 1995, 4 pages.

Edward A. Lee, "Design Methodology for DSP", 1992, 4 pages.

Pino et al, Interface Synthesis in Heterogeneous System-Level DSP Design Tools, May 1996, 4 pages.

Jose Luis Pino, Master's Report, "Software Synthesis for Single-Processor DSP Systems Using Ptolemy", May 1993, 48 pages.

Asawaree Kalavade and Edward A. Lee, "A Hardware-Software Codesign Methodology for DSP Applications", 1993, 12 pages.

Pino et al., "Automatic Code Generation for Heterogeneous Multiprocessors", 1994, 4 pages.

Tool Chest continues to Grow, Electronic Engineering Times, Dec. 15, 1995, 2 pages.

Pino et al., Mapping Multiple Independent Syunchronous dataflow Graphs onto Heterogeneous Multiprocessors, Oct. 1994, 6 pages.

Asawaree Kalavade and Edward A. Lee, Hardware/Software Co-Design Using Ptolemy—A Case Study, Sep. 1992, 18 pages.

Pino et al, "Software Synthesis for DSP Using Ptolemy", 1995, 15 pages.

vol. 1—Ptolemy 0.7 User's Manual, 1997, 532 pages.

i-Logix Product Overview, 1996, 52 pages.

Press Release, i-Logix Statemate Magnum Supports PCs, Jan. 31, 1997, 2 pages.

Press Release, i-Logix Signs Reseller Agreement for Virtual Prototypes, Inc.'s VAPS Product Line, Feb. 11, 1997, 2 pages.

Press Release, "i-Logix Introduces Rhapsody, Object-Oriented analysis, Design and Implementation Tool", Feb. 10, 1997, 2 pages.

Statemate/C Product Overview, 1995, 4 pages.

Press Release, "i-Logix and Integrated Systems Link Statemate MAGNUM and MATRIX AutoCode" Jan. 3, 1997, 2 pages.

PressRelease, i-Logix and Wind River unveil Industry's First Rapid Prototyping Solution for Testing Embedded Systems at ESC West in San Jose, Sep. 17, 1996, 3 pages.

Press Release, i-Logix Inc. Endorses Unified Modeling Language, Jan. 16, 1997, 1 page.

Philip Dean Lapsley, "Host Interface and Debugging of Dataflow DSP Systems", Thesis, 1991, pp. 1-51.

Lee et al., "Gabriel: A Design Environment for Programmable DSPs", 1988, pp. 1-11.

Lee et al., "Gabriel: A Design Environment for Dsp", IEEE Transactions on Acoustics, Speech, and Signal Processing, vol. 37, No. 11, Nov. 1989, pp. 1751-1762.

Bier et al., "Gabriel: A Design Environment for DSP", IEEE Micro Issue—vol. 10, No. 5, 1990, pp. 28-45.

Ludolph et al., "The Fabrik Programming Environment", IEEE, pp. 222-230, 1988.

Xiao-Yu, et al., "Software Environment for WASMII: A Data Driven Machine with a Virtual Hardware," Field Programmable Logic Architectures, Synthesis and Applications, 4$^{th}$ International Workshop on Field-Programmable Logic and Applications, FPL '94 Proceedings, Berlin, Germany, 1994.

Edwards, et al., "Software acceleration using programmable hardware devices," IEEE Proceedings: Computers and Digital Techniques, vol. 143, No. 1, Jan. 1996, pp. 55-63.

Leeser, et al, "High Level Synthesis and Generating FPGAs with the BEDROC System," Journal of VLSI Signal Processing, vol. 6, No. 2, Aug. 1993, pp. 191-214.

International Search Report for PCT/US 98/13040 mailed Dec. 22, 1998.

Ade, M; Lauwereins, R; Peperstraete, J.A.; Hardware-Software Codesign with GRAPE, Proceedings of the Sixth IEEE International Workshop on Rapid System Prototyping, Jun. 9, 1995, pp. 40-47.

Lauwereins, R; Engels, M; Ade, M; Peperstraete, J; Grape-II: A System-Level Prototyping Enrivonment for DSP Applications, Computer, vol. 28, Issue 2, Feb. 1995, pp. 35-43.

Weban, A., Brown, G. "A Software Development System for FPGA-based Data Acquisition Systems", FPGAs for Custom Computing Machines, 1996.

International Search Report, Application No. PCT/US00/22317, mailed Dec. 19, 2000.

Shaheen et al., "Remote Laboratory Experimentation", IEEE, Proceeding of American Control Conference, pp. 1326-1329, Jun. 1998.

Mario Žagar, Igor Čvrak and Armin Stranjak; "CORBA-based Remote Instrumentation"; 9$^{th}$ Mediterranean Electrotechnical Conference (MELECON); May 1998; pp. 1294-1298; vol. 2; Tel-Aviv.

Bruce Douglas, Ph.D.; "Custom Embedded Communication Protocols"; Conference Proceedings of Embedded Systems Conference East; Mar. 10-12, 1997; pp. 637-657; Boston, Massachusetts.

Jean Labrosse; "Inside Real-Time Kernels," Conference Proceedings of Embedded Systems Conference East, Mar. 10-12, 1997, pp. 205-214; Boston, Massachusetts.

Jean Labrosse; "Designing with Real-Time Kernels"; Conference Proceedings of Embedded Systems Conference East, Mar. 10-12, 1997, pp. 379-389; Boston, Massachusetts.

William Stallings; "Operating Systems—Multiprocessor and Real-Time Scheduling"; 1995; pp. 394-414; 2nd Ed., Prentice Hall.

Sam Shearman; "Hardware-in-the-loop connectivity extends continuous-system simulation"; Personal Engineering; Jun. 1997; pp. 18-37.

"LabVIEW User Manual for Windows"; Sep. 1994; pp. 4/1-4/21; National Instruments Corporation; Austin, TX.

Adam Beguelin, Jack Dongarra, Al Geist, and Vaidy Sunderam; "Visualization and Debugging in a Heterogeneous Environment"; Computer; Jun. 1993; pp. 88-95; vol. 26, Issue 6.

Rahman Jamal and Lothar Wenzel; "The Applicability of the Visual Programming Language LabVIEW to Large Real-World Applications"; IEEE, 1995, pp. 99-106.

Per-Arne Wiberg; "Graphical Programming of Time-Deterministic Real-Time Systems"; Second IEEE Conference on Engineering of Complex Computer Systems; 1996; pp. 173-180.

D. Gillet, C. Salzmann, R. Longchamp, and D. Bonvin; "Telepresence: An Opportunity to Develop Real-World Experimentation Education"; European Control Conference; Jul. 1997; pp. 1-6; Brussels, Belgium.

William E. Johnston, William Greiman, Gary Hoo, Jason Lee, Brian Tierney, Craig Tull, and Douglas Olson; "High-Speed Distributed Data Handling for On-Line Instrumentation Systems"; ACM/IEEE 1997 Supercomputing Conference; Aug. 16, 1997; pp. 1-19.

\* cited by examiner

GRAPHICAL PROGRAMMING SYSTEM WITH BLOCK DIAGRAM EXECUTION AND DISTRIBUTED USER INTERFACE DISPLAY

PRIORITY CLAIM

This application is a continuation of U. S. patent application Ser. No. 09/617,600 titled "Graphical Programming System with Distributed Block Diagram Execution and User Interface Display" filed Jun. 13, 2000, whose inventors were Robert Dye, Darshan Shah, Steve Rogers, Greg Richardson, and Dean A. Luick, now issued as U.S. Pat. No. 6,802,053, which claims benefit of priority of U.S. provisional application Ser. No. 60/149,950 titled "Graphical Programming System with Distributed Block Diagram Execution and Front Panel Display" filed Aug. 19, 1999, whose inventors were Robert Dye, Darshan Shah, Steve Rogers, and Greg Richardson, and which is also a continuation-in-part of U.S. patent application Ser. No. 08/912,445, titled "Embedded graphical programming system", filed Aug. 18, 1997, whose inventors were Jeffrey L. Kodosky, Darshan Shah, Samson DeKey, and Steven Rogers, now issued as U.S. Pat. No. 6,173,438.

FIELD OF THE INVENTION

The present invention relates to the field of graphical programming and virtual instrumentation. In particular, the invention relates to a system and method wherein a graphical program block diagram executes on a server computer, and one or more client computers receive and display a graphical program user interface panel corresponding to the block diagram, wherein the graphical program user interface panel can be used to provide input to or display output to from the block diagram. The present invention further relates to a distributed virtual instrumentation system, wherein a block diagram executes on a server computer and one or more front panels are displayed on client computers.

DESCRIPTION OF THE RELATED ART

Traditionally, high level text-based programming languages have been used by programming languages exist, including BASIC, C, FORTRAN, Pascal, COBOL, ADA, APL, etc. Programs written in these high level languages are translated to the machine language level by translators known as compilers or interpreters. The high level text-based programming languages in this level, as well as the assembly language level, are referred to as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model a process often is further complicated by the fact that a sequence of mathematical formulas, mathematical steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptually model a system and then to program a computer to model that system. Since a user often is not fully proficient in techniques for programming a computer system in a text-based environment to implement his model, the efficiency with which the computer system can be utilized to perform such modeling often is reduced.

Examples of fields in which computer systems are employed to model and/or control physical systems are the fields of instrumentation, process control, industrial automation, and simulation. Computer modeling or control of devices such as instruments or industrial automation hardware has become increasingly desirable in view of the increasing complexity and variety of instruments and devices available for use. However, due to the wide variety of possible testing/control situations and environments, and also the wide array of instruments or devices available, it is often necessary for a user to develop a program to control a desired system. As discussed above, computer programs used to control such systems had to be written in conventional text-based programming languages such as, for example, assembly language, C, FORTRAN, BASIC, or Pascal. Traditional users of these systems, however, often were not highly trained in programming techniques and, in addition, traditional text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment, which enables a user to easily and intuitively model a process. The graphical programming environment disclosed in Kodosky et al can be considered the highest and most intuitive way in which to interact with a computer. A graphically based programming environment can be represented at a level above text-based high level programming languages such as C, Pascal, etc. The method disclosed in Kodosky et al allows a user to construct a diagram using a block diagram editor, such that the diagram created graphically displays a procedure or method for accomplishing a certain result, such as manipulating one or more input variables to produce one or more output variables. In response to the user constructing a data flow diagram or graphical program using the block diagram editor, data structures may be automatically constructed which characterize an execution procedure which corresponds to the displayed procedure. The graphical program may be compiled or interpreted by a computer using these data structures. Therefore, a user can create a computer program solely by using a graphically based programming environment. This graphically based programming environment may be used for creating virtual instrumentation systems, industrial automation systems, modeling processes, and simulation, as well as for any type of general programming.

Therefore, Kodosky et al teaches a graphical programming environment wherein a user places or manipulates icons in a block diagram using a block diagram editor to create a graphical "program." A graphical program for controlling or modeling devices, such as instruments, processes or industrial automation hardware, is referred to as a virtual instrument (VI). In creating a virtual instrument, a user may create a front panel or user interface panel. The front panel includes various front panel objects, such as controls or indicators, that represent or display the respective input and output that will be used by the graphical program or VI, and may include other icons which represent devices being controlled. When the controls and indicators are created in the front panel, corresponding icons or terminals may be automatically created in the block diagram by the block diagram editor. Alternatively, the user can place terminal icons or input/output blocks in the block diagram which may cause the display of corresponding front panel objects in the front panel, either at edit time or at run time.

During creation of the graphical program, the user selects various functions that accomplish his desired result and connects the function icons together. For example, the functions may be connected in a data flow and/or control flow format. The functions may be connected between the terminals of the respective controls and indicators. For example, the user may create or assemble a data flow program, referred to as a block diagram, representing the graphical data flow which accomplishes his desired function. The assembled graphical program may then be compiled or interpreted to produce machine language that accomplishes the desired method or process as shown in the block diagram.

A user may input data to a virtual instrument using front panel controls. This input data propagates through the data flow block diagram or graphical program and appears as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, and machine vision applications, among others.

In many scenarios, it would be desirable to further separate the user interface panel, also referred to above as the front panel, of a graphical program from the block diagram of the graphical program. For example, a user developing an instrumentation application, such as a test and measurement application or a process control application, may desire the graphical program to execute on a computer located in a laboratory or manufacturing facility, but may want to interact with the program by viewing the program's user interface panel from another computer, such as a workstation located in the user's office. As another example, a program developer may construct a graphical program and desire to enable others to interact with or view the results of the program. For example, the program developer may desire to enable multiple Internet users to connect to the computer running the graphical program and view the graphical program's user interface.

It would thus be desirable to provide a general system and method for enabling various types of graphical programs having various types of user interface panels to export their user interface panels as described above, with a minimal amount of programming effort. It may also be desirable to provide the above capabilities using common networking and software standards so that users working on various types of computing platforms could connect to the remote computer running the graphical program, view the user interface panel of the graphical program, and possibly also use the user interface panel to remotely use or control the graphical program. It may also be desirable to require users to install a minimal amount of client software in order to gain these abilities, and/or to enable the necessary client software to be automatically downloaded and installed.

SUMMARY OF THE INVENTION

The problems outlined above may in large part be solved by providing a system and method enabling distributed display of the user interface of a graphical program executing on a server computer. In one embodiment, the system includes a server computer where a graphical program executes, and one or more client computers connected to the server computer which receive and display a user interface, e.g., one or more user interface panels, corresponding to the graphical program. In one embodiment, the user interface can be used from the client computer(s) to provide input to or display output from the graphical program during program execution. In one specific embodiment, the invention may comprise a distributed virtual instrumentation system, wherein a graphical program executes on a server computer to perform a measurement or automation function, and one or more front panels are displayed on client computers, thus enabling one or more users to remotely view and/or control the measurement or automation function.

In one embodiment, a user of a client computer specifies a remote server computer on which a graphical program executes. The remote server information may be specified in various ways. For example, the information may be specified as a uniform resource locator (URL), as an internet protocol (IP) address, as a machine name and TCP/IP port number, etc. In one embodiment, a user may specify the remote computer by entering a URL into an application such as a web browser or other application with web-browsing functionality. As described below, the application may include a protocol handler plug-in enabled to process the URL and connect to the remote computer.

When the user specifies the remote computer running the graphical program, the user may also specify the particular graphical program desired. For example, a parameter indicating the name of the graphical program may be appended to the URL, etc. The user may also specify the remote computer without also specifying the particular graphical program. For example, the remote computer may comprise a web server. The user may enter the URL of a web page associated with the web server, and the web server may return a list of graphical programs running on the remote computer. The user may then select one or more graphical programs from this list. The user's client software is operable to then display the user interface panels associated with the selected graphical program(s) on the user's display screen.

In one embodiment, the user's client software comprises a web browser (or application with web-browsing functionality) with a plug-in operable to communicate with the remote graphical program. In this embodiment, the plug-in may display the user interface panel directly in the web browser's window. The user's client software preferably communicates with an agent or software program running on the remote computer using a communication protocol based on the standard TCP/IP protocol. When the user specifies the remote computer for a connection, the agent on the remote computer transfers a description of the graphical program's user interface panel to the user's client software. This description may be sent in the same format used to store the user interface panel information on the remote computer. The user interface panel description may, of course, be sent in various other formats, e.g., as an XML description. The user's client-side software, e.g., web browser plug-in, is preferably enabled to interpret any type of user interface panel description that it may receive from the remote computer, and is enabled to appropriately display the user interface panel to the user.

Once the graphical program's user interface panel is received and displayed on the user's display screen, the user interface panel may be dynamically updated during execution of the graphical program block diagram. For example, the user interface panel may include a graph which displays various types of measurement data produced by the block diagram, such as an electrical signal, meteorological data, etc., and this graph may scroll on the user's display as the measured data values change in response to graphical program execution. As another example, the user interface panel may comprise numerical text indicators that are updated with new values periodically, etc.

The user may also interact with the user interface panel on the client computer to provide input to the block diagram executing on the server computer, e.g. by issuing standard point-and-click type GUI commands. The user's input is passed to the remote graphical program on the server computer, and the graphical program responds accordingly. In other words, the user may interact with the remote graphical program exactly as he would interact with the program if it were running locally on the user's computer. A means for coordinating control among users may be included so that multiple users interacting with the same graphical program do not interfere with each others' actions.

As described below, in one embodiment, a user may also request and receive the remote graphical program's block diagram, e.g., to edit or debug the graphical program.

As noted above, in the preferred embodiment, a TCP/IP-based communication protocol is used for communication between the user's client software and the remote server computer executing the graphical program. In an alternative embodiment, the DataSocket system and method, disclosed in U.S. patent application Ser. No. 09/185,161, may be used to facilitate the communication between the user's client software and the remote computer running the graphical program. The DataSocket system comprises a client software component that addresses data sources/targets using a URL, much the way that a URL is used to address web pages anywhere in the world.

In one embodiment, the remote graphical program executes within a graphical programming environment including functionality referred to as "VI Server". VI Server functionality may be used to enable user clients to connect to and interact with a remote graphical program. For more information on VI Server, please refer to the patent applications incorporated by reference below.

BRIEF DESCRIPTION OF THE DRAWINGS

A better understanding of the present invention can be obtained when the following detailed description of the preferred embodiment is considered in conjunction with the following drawings, in which.

Figure 1:
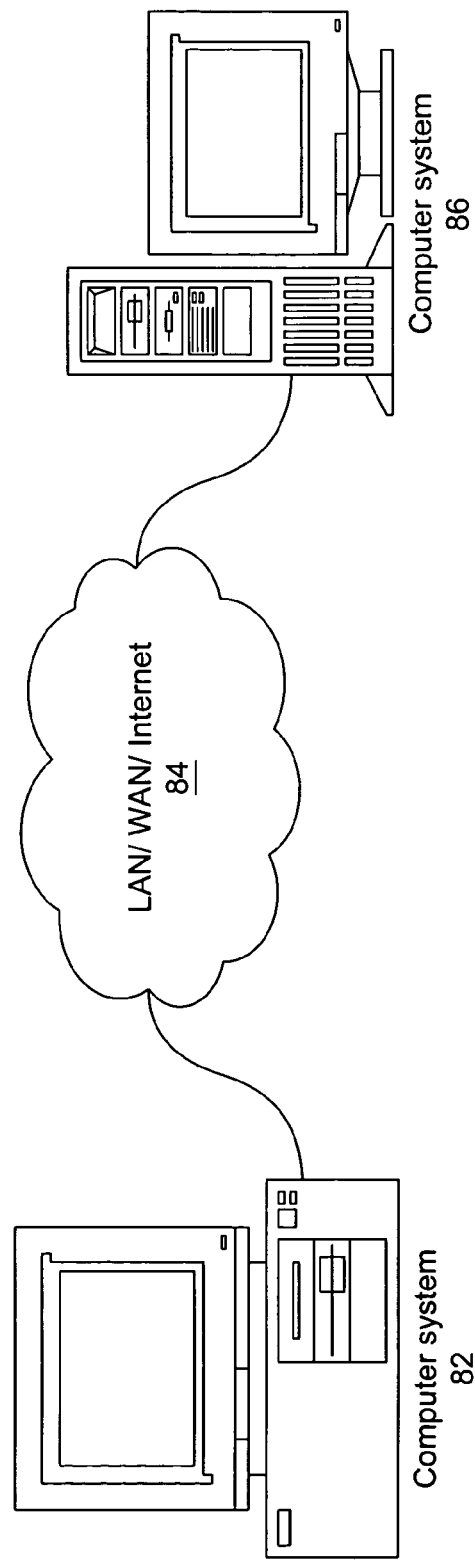
FIG. 1 illustrates a computer system connected through a network to a second computer system.

While the invention is susceptible to various modifications and alternative forms specific embodiments are shown by way of example in the drawings and are herein described in detail. It should be understood however, that drawings and detailed description thereto are not intended to limit the invention to the particular form disclosed. But on the contrary the invention is to cover all modifications, equivalents and alternative following within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein.

U.S. patent application Ser. No. 08/912,445 titled "Embedded Graphical Programming System" filed Aug. 18, 1997.

U.S. patent application Ser. No. 08/810,079 titled "System and Method for Developing Automation Clients Using a Graphical Data Flow Program" filed Mar. 4, 1997.

U.S. patent application Ser. No. 08/916,005 titled "System and Method for Providing Client/Server Access to Graphical Programs" filed Aug. 21, 1997.

U.S. patent application Ser. No. 09/136,123 titled "System and Method for Accessing Object Capabilities in a Graphical Program" filed Aug. 18, 1998.

U.S. patent application Ser. No. 09/518,492 titled "System and Method for Programmatically Creating a Graphical Program" filed Mar. 3, 2000.

U.S. patent application Ser. No. 09/185,161 titled "Data Socket System and Method for Accessing Data Sources Using URLs" filed Nov. 3, 1998, whose inventor was Paul F. Austin.

U.S. patent application Ser. No. 09/374,740 titled "System and Method for Automatically Creating URLs for Accessing Data Sources and Data Targets" filed Aug. 13, 1999, whose inventors were Paul Austin, David Fuller, Kurt M. Carlson, Chris Mayer, Stephen Rogers, Joe Savage, and Brian Sierer.

U.S. patent application Ser. No. 09/546,047 titled "System and Method for Connecting to and Viewing Live Data using a Standard User Agent" filed Apr. 10, 2000, whose inventor was Paul Austin.

FIG. 1—Computer System Connected to a Network

FIG. 1 illustrates an exemplary computer network in which a computer system 82 is connected through a network 84 to a second computer system 86. The computer system 82 and the second computer system 86 can be any of various types, as desired. The network 84 can also be any of various types, including a LAN (local area network), WAN (wide area network), or the Internet, among others.

A user of computer system 82 may connect to computer system 86, according to the system and method described herein. Computer system 82, which may be referred to as client computer system 82, comprises client software enabled to receive a description of a graphical program user interface panel and display the panel on the display screen of computer system 82. For example the client software may comprise a web browser with a web browser plug-in. For example, the web browser may be the Microsoft Internet Explorer web browser, and the plug-in may be constructed according to Microsoft's Asynchronous Pluggable Protocols specification.

Computer system 86, which may be referred to as server computer system 86, comprises a graphical program, as well as server-side programs or agents enabling the user of computer system 82 to communicate with computer system 86 according to the present invention. For example, computer system 86 may include VI Server functionality, as discussed above.

Although, only one client is shown connected to computer system 86, as described above, multiple clients may connect to computer 86 in order to view the graphical program's user interface panel and/or interact with the graphical program. Computer system 86 preferably includes a mechanism for coordinating control of the graphical program among multiple remote users. For example, computer system 86 may distribute control of the graphical program among the users using various methods or algorithms, such as a round-robin scheme, prioritized round-robin scheme, etc. Various types of privileges or permissions may be assigned to different users, granting them different levels of control over the graphical program. For example, the program creator may be authorized to assume complete control over the program, locking out other users. Other users may only be authorized to view the graphical program's user interface panel, but not to use it to control the graphical program, e.g., these users may not be allowed to provide input to the graphical program.

Figure 2A:
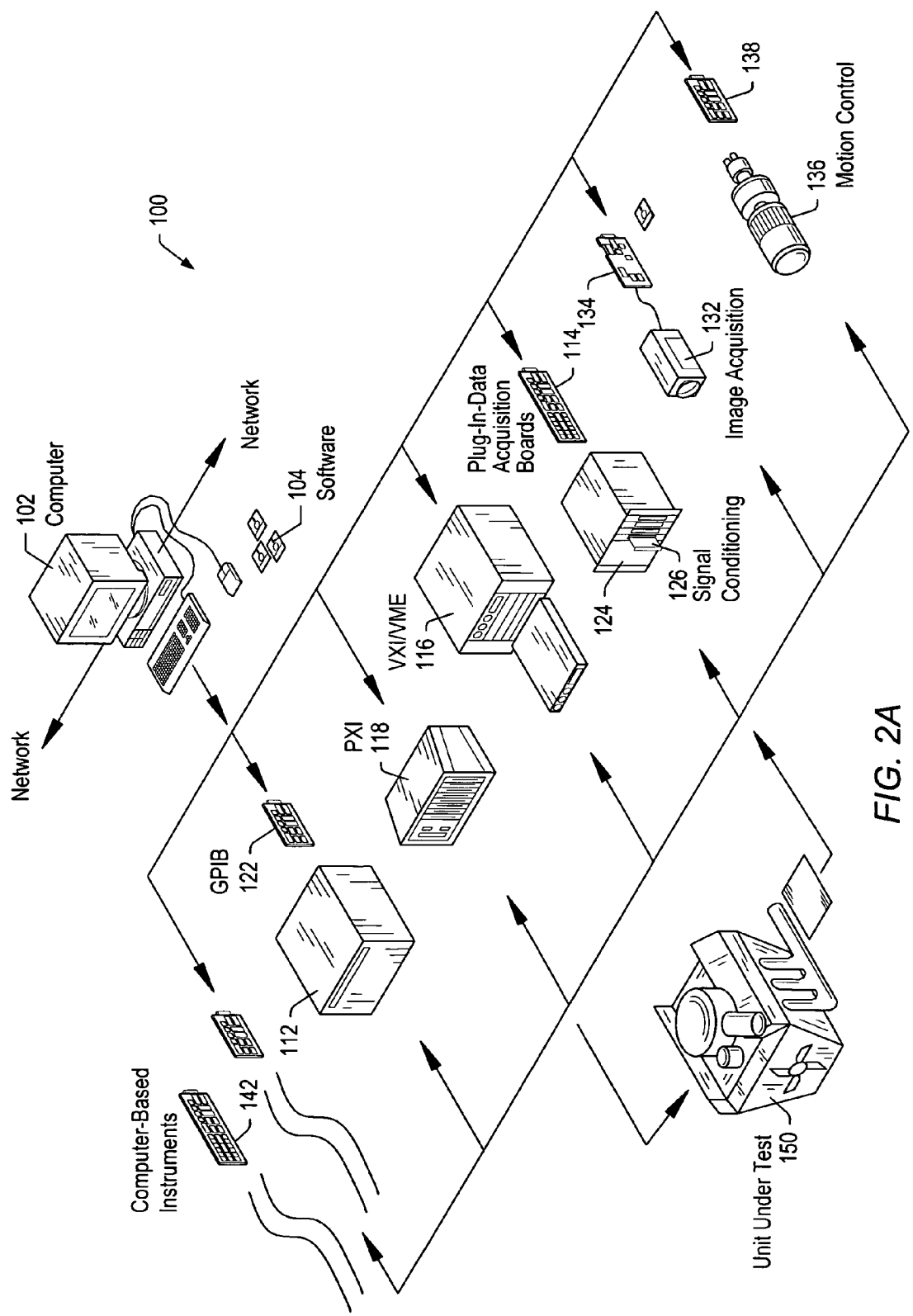
FIGS. 2A and 2B illustrate representative instrumentation and process control systems including various I/O interface options.
Figure 2B:
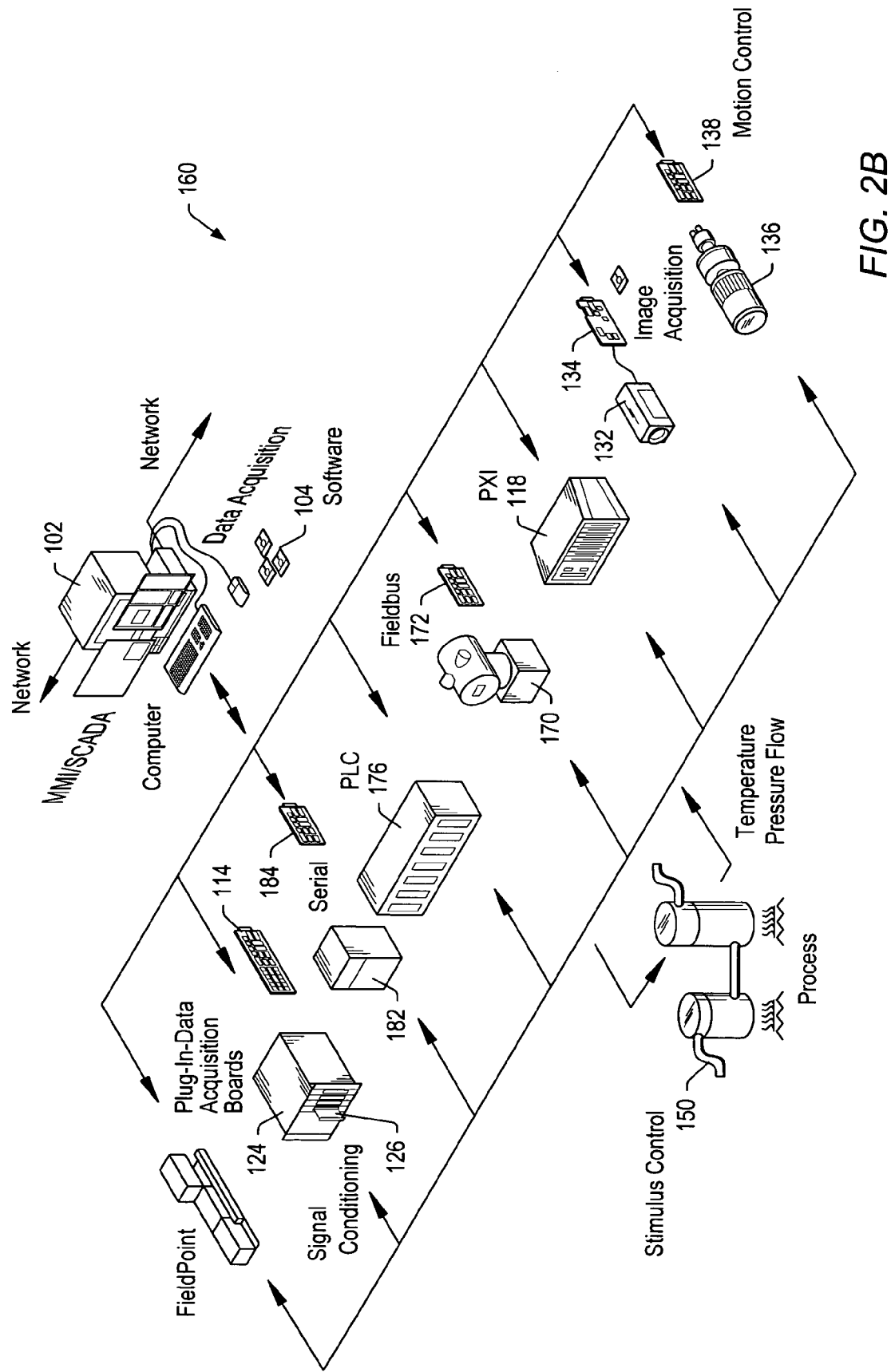

FIGS. 2A and 2B—Instrumentation and Industrial Automation Systems

FIGS. 2A and 2B illustrate exemplary systems that may store or use programs according to the present invention. These exemplary systems illustrate systems specialized for instrumentation, process control, or other purposes. FIGS. 2A and 2B illustrate exemplary server computer systems. Thus, the server computer 86 described above may be comprised in an instrumentation or industrial automation system, wherein the present invention allows for distributed control of a test or automation application. The present invention may of course be used in other types of applications as desired.

FIG. 2A illustrates an instrumentation control system 100. The system 100 comprises a host computer 86 (server computer 86) which connects to one or more instruments. The host computer 86 comprises a CPU, a display screen, memory, and one or more input devices such as a mouse or keyboard as shown. The computer 86 connects through the one or more instruments to analyze, measure, or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 is coupled to the computer 86 via the GPIB interface card 122 provided by the computer 86. In a similar manner, the video device 132 is coupled to the computer 86 via the image acquisition card 134, and the motion control device 136 is coupled to the computer 86 through the motion control interface card 138. The data acquisition board 114 is coupled to the computer 86, and may interface through signal conditioning circuitry 124 to the UUT. The signal conditioning circuitry 124 preferably comprises an SCXI (Signal Conditioning eXtensions for Instrumentation) chassis comprising one or more SCXI modules 126.

The GPIB card 122, the image acquisition card 134, the motion control interface card 138, and the DAQ card 114 are typically plugged in to an I/O slot in the computer 86, such as a PCI bus slot, a PC Card slot, or an ISA, EISA or Micro-Channel bus slot provided by the computer 86. However, these cards 122, 134, 138 and 114 are shown external to computer 86 for illustrative purposes.

The VXI chassis or instrument 116 is coupled to the computer 86 via a VXI bus, MXI bus, or other serial or parallel bus provided by the computer 86. The computer 86 preferably includes VXI interface logic, such as a VXI, MXI or GPIB interface card (not shown), which interfaces to the VXI chassis 116. The PXI chassis or instrument is preferably coupled to the computer 86 through the computer's PCI bus.

A serial instrument (not shown) may also be coupled to the computer 86 through a serial port, such as an RS-232 port, USB (Universal Serial bus) or IEEE 1394 or 1394.2 bus, provided by the computer 86. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 comprises a computer 86 which connects to one or more devices or instruments. The computer 86 comprises a CPU, a display screen, memory, and one or more input devices such as a mouse or keyboard as shown. The computer 86 connects through the one or more devices to a process or device 150 to perform an automation function, such as MMI (Man Machine Interface), SCADA (Supervisory Control and Data Acquisition), portable or distributed data acquisition, process control, advanced analysis, or other control.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The DAQ card 114, the PXI chassis 118, the video device 132, and the image acquisition card 136 are preferably connected to the computer 86 as described above. The serial instrument 182 is coupled to the computer 86 through a serial interface card 184, or through a serial port, such as an RS-232 port, provided by the computer 86. The PLC 176 couples to the computer 86 through a serial port, Ethernet port, or a proprietary interface. The fieldbus interface card 172 is preferably comprised in the computer 86 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 86 as described above. However, these cards 114, 184, 172, 134, and 138 are shown external to computer 86 for illustrative purposes. In typical industrial automation systems a device will not be present of each interface type, and in fact many systems may only have one or more devices of a single interface type, such as only PLCs. The devices are coupled to the device or process 150.

Referring again to FIGS. 2A and 2B, the server computer system 86 preferably includes a memory medium on which one or more computer programs or software components according to the present invention are stored. The term "memory medium" is intended to include an installation medium, e.g., a CD-ROM, floppy disks 104, or tape device, a computer system memory or random access memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer provides the program instructions to the first computer for execution. The server computer system 86 may take any of various forms. In a similar manner, the client computer system 82 may take any of various forms, including a personal computer system, workstation, network appliance, Internet appliance, personal digital assistant (PDA), television system or other device. In general, the term "computer system" can be broadly defined to encompass any device having at least one processor which executes instructions from a memory medium.

In one embodiment, the memory medium of the server computer 86 stores software programs for communicating with the client computer system 82, according to the present invention. For example, the server computer 86 may store network communication software, e.g., TCP/IP software, and may also store application-level software, such as a graphical programming system enabled to communicate with remote computers.

In one embodiment, the memory medium of the client computer 82 stores software programs for communicating with the server computer system 86, according to the present invention. For example, the client computer 82 may store a standard user agent, such as a web browser or other application with web-browsing functionality, and possibly a specialized browser plug-in for communicating with the server computer.

In one embodiment, the graphical program that users may remotely view or control is a program for data acquisition/generation, analysis, and/or display, or for controlling or modeling instrumentation or industrial automation hardware. For example, in the preferred embodiment, the graphical program is a program constructed using the National Instruments LabVIEW graphical programming environment application, which provides specialized support for developers of instrumentation and industrial automation applications.

However, it is noted that the present invention can be used for a plethora of applications and is not limited to instrumentation or industrial automation applications. In other words, FIGS. 2A and 2B are exemplary only, and users may remotely interact with graphical programs for any of various types of purposes in any of various applications.

Figure 3:
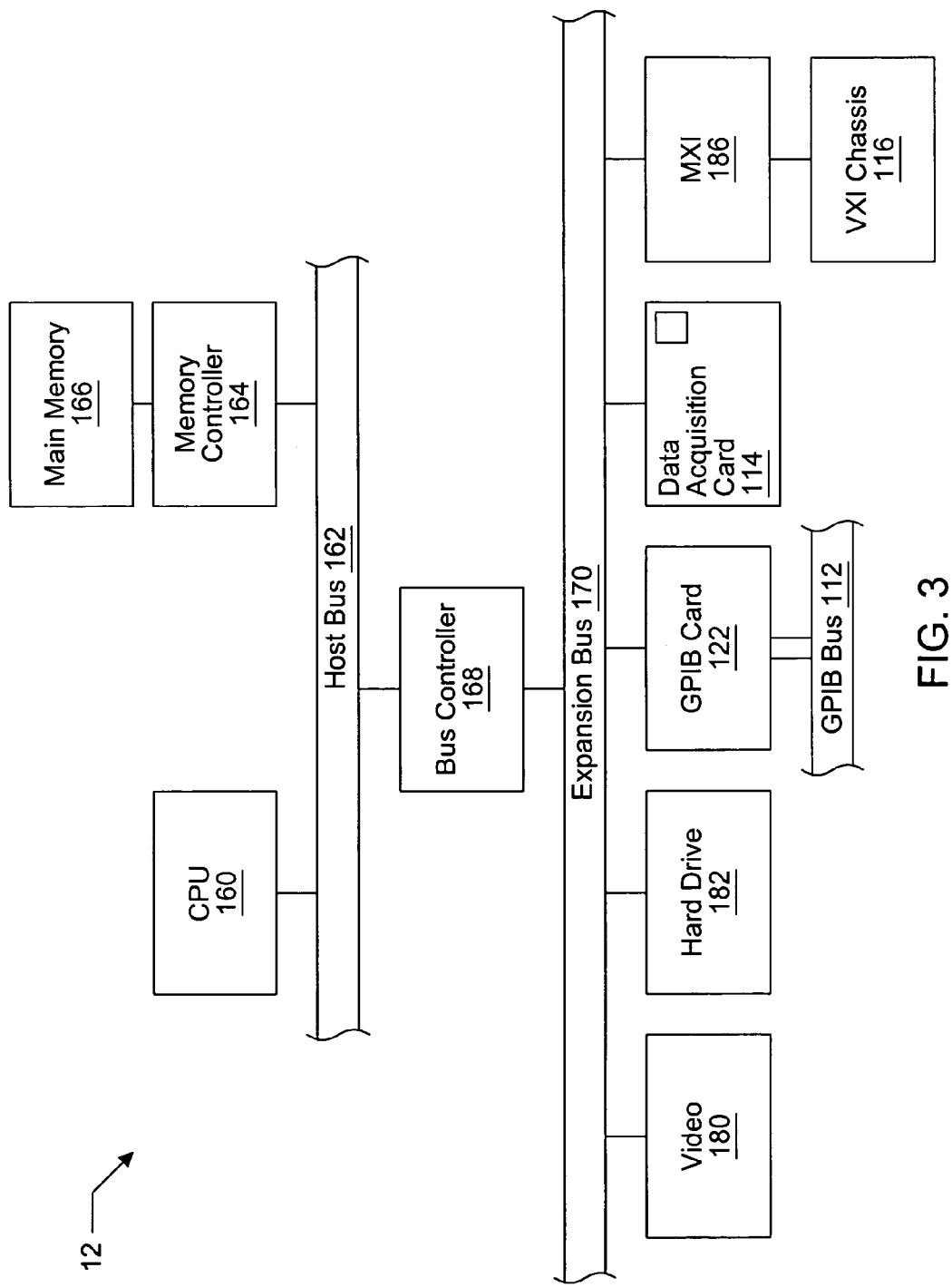
FIG. 3 is a block diagram of the computer system of FIGS. 1, 2A and 2B.

FIG. 3—Computer System Block Diagram

FIG. 3 is a block diagram of the computer system illustrated in FIGS. 1, 2A and 2B. It is noted that any type of computer system configuration or architecture can be used as desired, and FIG. 3 illustrates a representative PC embodiment. It is also noted that the computer system may be a general purpose computer system as shown in FIGS. 2A and 2B, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 86 (or 82) includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 stores computer programs according to the present invention. The main memory 166 also stores operating system software as well as the software for operation of the computer system, as well known to those skilled in the art. The computer programs of the present invention will be discussed in more detail below.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 2A), a GPIB interface card 122 which provides a GPIB bus interface to the GPIB instrument 112 (of FIG. 2A), and a VXI or MXI bus card 186 coupled to the VXI chassis 116 for receiving VXI instruments. The computer 86 further comprises a video display subsystem 180 and hard drive 182 coupled to the expansion bus 170.

Figure 4:
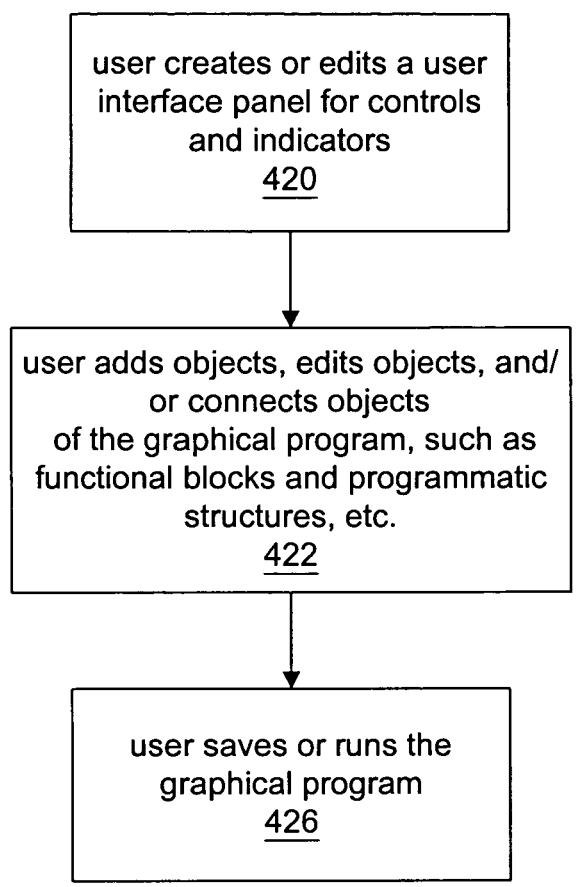
FIG. 4 is a flowchart diagram illustrating one embodiment of interactively creating or editing a graphical program.
Figure 5:
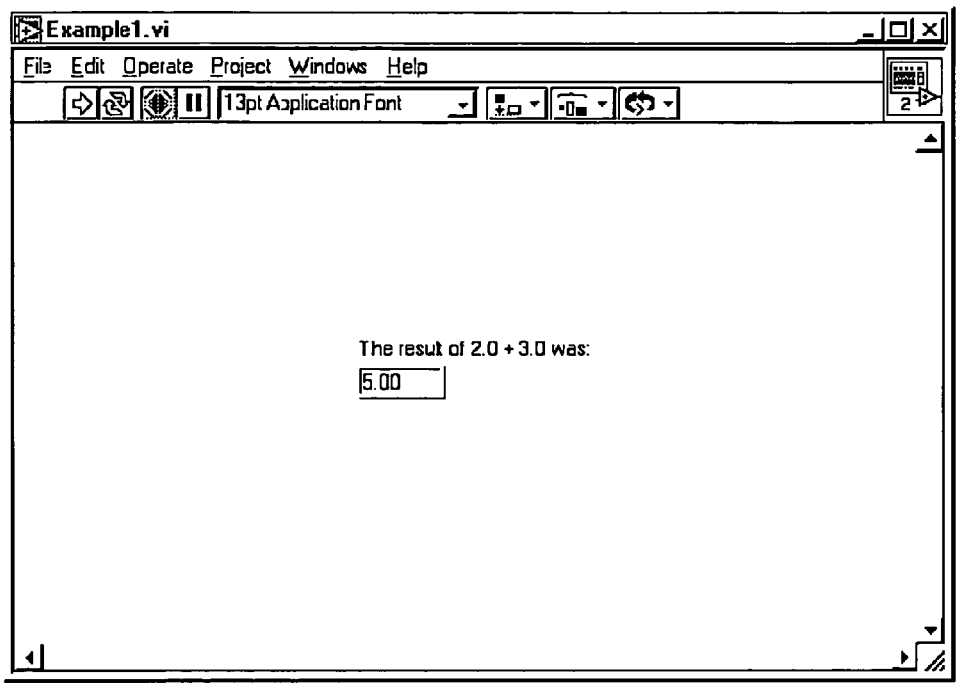
FIGS. 5 and 6 illustrate a simple graphical program comprising a user interface panel and a block diagram.
Figure 6:
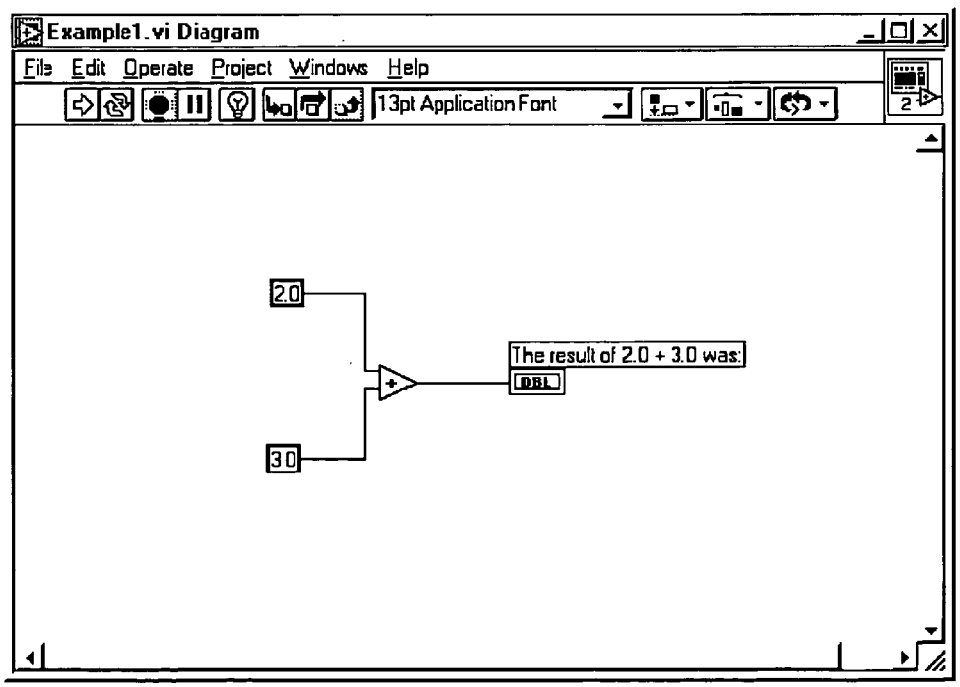

FIGS. 4-6: Interactive Creation of a Graphical Program by a User

FIG. 4 is a flowchart diagram illustrating one embodiment of how a user may interactively or manually create or edit a graphical program. As shown in the flowchart and described below, the user interactively adds various objects to a graphical program, connects them together, etc. It is noted that the various steps of FIG. 4 may be performed in various orders, or omitted as desired.

In the embodiment shown in FIG. 4, the steps are performed by a developer creating or editing a graphical program in a graphical programming environment. As shown, in step 420 the developer may create or edit a user interface panel for displaying a graphical user interface. The user interface panel may comprise controls for accepting user input, displaying information such as program output, or both. For example, the user interface panel may include buttons, selectable lists, text boxes, graph controls, images, etc. A developer may "drop" various controls or other objects onto the user interface panel, e.g., by selecting the desired control from a control palette. FIG. 5 illustrates a simple user interface panel. Step 420 is not necessarily performed. For example, a user interface panel may not be desired, a user interface panel may be inherently specified during creation of the block diagram, or a user interface panel may automatically be created as the user creates the executable portions of the graphical program.

In step 422 the developer creates or edits the executable portion of the graphical program, which may referred to as a block diagram. A graphical program may include a block diagram comprising objects referred to herein as "nodes" which are connected together to model the program execution logic, data flow and/or control flow. A block diagram node may be displayed as an icon representing the type or functionality of the node. FIG. 6 illustrates a simple block diagram. As a developer adds objects to the user interface panel, the graphical programming environment may automatically create a corresponding object on the block diagram. Such block diagram nodes which correspond to user interface panel objects are referred to herein as user interface nodes or terminals. For example, the FIG. 6 block diagram node labeled "The result of 2.0+3.0 was:" is a user interface node corresponding to the FIG. 5 user interface output indicator. User interface nodes may be connected with other objects or nodes in the block diagram to participate in the program logic and data/control flow. User interface nodes may map input/output between a user interface panel and a block diagram. For example, the user interface node in FIG. 6 receives data and displays the data in the corresponding user interface indicator in FIG. 5.

In step 422 of FIG. 4, the developer adds other objects/nodes to or edits other objects/nodes of the graphical program. These objects or nodes may include function nodes which perform predefined functional operations such as numeric functions, Boolean functions, string functions, array functions, error functions, file functions, application control functions, etc. For example the block diagram shown in FIG. 6 uses an addition function node to add two constants together. In step 422 the developer may also add other types of nodes to the graphical program. For example, nodes may be added which represent numeric constants. FIG. 6 illustrates numeric constant nodes representing the floating point constants 2.0 and 3.0.

Other types of nodes which may be added include subprogram nodes for calling a graphical subprogram, global or local variable nodes for defining and using variables, etc. In step 422, the developer may also add other types of objects to the graphical program. For example, objects representing programmatic structures such as for loops, while loops, case structures, etc. may be added. The developer may add nodes and other types of objects to a graphical program in various ways, e.g., by selecting a node or object from a palette that displays icons representing the various nodes and objects.

In step 422 of FIG. 4, the developer may also connect or "wire" the graphical program objects in order to achieve the desired executable logic, data flow, and/or control flow. For example the objects may include input and output terminals, and the developer may connect the output terminal of one node to the input terminal of another node, etc. FIG. 6 illustrates one embodiment of how objects may be connected. In this example, output terminals of the two numeric constant nodes are connected to the input terminals of an addition function node. The addition function node performs the addition operation on the numeric input. The output terminal of the addition function node is connected to the input of the user interface indicator node so that the result of the addition operation is displayed in the user interface panel shown in FIG. 5.

Programmatic structure objects may also include terminals which integrate them with the other objects of the graphical program. For example, a while loop may comprise a condition terminal to which an output terminal of a node supplying a Boolean value may be connected to signify when the loop should end.

For more information on one embodiment of creating or editing a graphical program, please see the various LabVIEW User and Developer manuals, and LabVIEW version 5.1, available from National Instruments Corporation, which are hereby incorporated by reference.

In step 426 of FIG. 4, the developer saves or runs the graphical program. The graphical program may be saved in any of various formats. For example, a tree of data structures may be built which represents the various elements of the graphical program and the relationships among the elements, and the data structures may be saved in a binary or text format. These data structures may be compiled into machine code, or interpreted during execution. If the graphical program includes user interface panels, these panels may also be saved. In step 426 the developer may also execute the graphical program. The developer may run the graphical program in any of various ways. For example, a graphical programming environment may allow a program to be run from within the development environment, or the developer may create a standalone program and run the program, etc.

It is noted that steps 420 through 426 typically occur in an iterative manner and typically occur in various orders. For example a developer may add a user interface control to a user interface panel, then connect a user interface node corresponding to the control to another node, then add and connect a function node to the program, then run the program to test it, then change the way a node is connected, etc. Also, as noted above, step 420 may be automatically (e.g., programmatically) performed in response to step 422. In addition, the user interface panel may be automatically created at edit time, or may be automatically generated at run time. Thus, the flowchart of FIG. 4 is exemplary, and various steps may be combined, omitted, added, or modified as required or desired for developing different graphical programs or using different embodiments of graphical program development environments.

Figure 7:
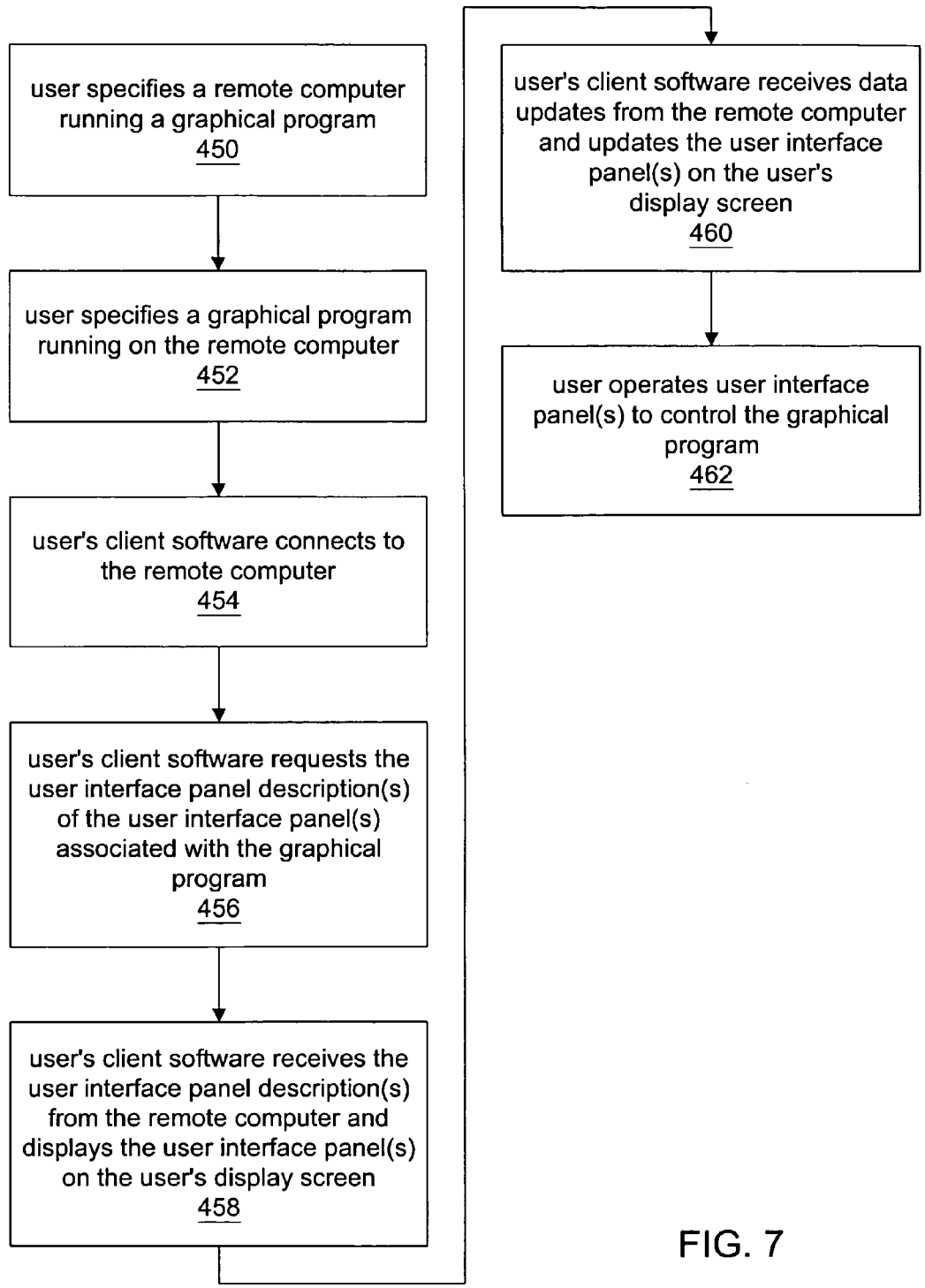
FIG. 7 is a flowchart diagram illustrating one embodiment of a user accessing a remote graphical program.

FIG. 7—Accessing a Remote Graphical Program

FIG. 7 is a flowchart diagram illustrating one embodiment of a user accessing a remote graphical program. In alternative embodiments, various steps of FIG. 7 may be combined, altered, omitted, or may occur in different orders.

As shown, in step 450 of FIG. 7, a user specifies a remote computer. In step 452, the user specifies a graphical program on the remote computer. Steps 450 and 452 may be combined into a single step. As discussed above, steps 450 and 452 may be accomplished in any of various ways. For example, the remote computer and/or the remote graphical program may be implicitly specified by a user specifying a URL which references the remote computer or the remote graphical program. Note that steps 450 and 452 are not necessarily performed directly by a user, but may also be performed programmatically. For example, a user may operate an application that provides a reference to a remote computer and remote graphical program to client software running on the user's machine, which is described below.

In the preferred embodiment, the user performs steps 450 and 452 by interacting with standard, commonly-available client software, such as a web browser or an application including web-browsing functionality, e.g., an application using the Microsoft Internet Explorer code base. For example, the user may provide a URL to the browser application, and the browser application may then contact a web server and receive a list of graphical programs running on the web server computer or another computer. The user may then select one or more of these graphical programs, e.g. by clicking on a hypertext link, etc. Selecting a graphical program may then cause the user's browser application to invoke a browser plug-in to handle the remaining steps of FIG. 7.

Other embodiments of steps 450-452 are also contemplated. For example, the user may still work within the context of a web browser environment, but may not interact with a web server at any point. For example, the user may provide a URL to the web browser, wherein the URL comprises a protocol scheme which is not natively supported by the web browser. In response, the web browser may delegate the URL to a protocol handler plug-in. For example, such a protocol handler plug-in may be constructed according to the Microsoft Asynchronous Pluggable Protocols specification. The plug-in may then directly contact the remote computer comprising the resource, e.g. graphical program, that the URL references and may continue with steps of FIG. 7.

In step 454, the user's client software, e.g. web browser plug-in, connects to the remote computer. The remote computer may have an application or agent operable to support the server-side operations corresponding to the client-side operations illustrated in FIG. 7. Any of various application-level protocols may be used to communicate between the client software and the server software. In the preferred embodiment, a communication protocol based on the TCP/IP protocol is used for communication with the remote computer. At the time of connection, the remote graphical program may already be running on the remote computer, or the remote computer may be operable to launch the program in response to the client computer connecting.

In step 456, the user's client software requests the remote computer to send a description of the user interface panel(s) associated with the graphical program specified in step 452. Step 456 may be combined with step 454. In response to this request, the remote computer sends the description of the user interface panel(s).

In step 458, the user's client software, e.g. web browser plug-in, receives the description of the user interface panel(s) and displays the user interface panel(s) appropriately. In the preferred embodiment, the user interface panel description(s) that the client software receives is a description based on or identical to the description that the remote computer uses to persistently store the user interface panel information. In other words, when a graphical program and its user interface panel is created and saved on the remote computer, the information describing the user interface panel is structured in a particular way. In the preferred embodiment, the user's client software is operable to parse this structured information and display the user interface panel(s) appropriately on the user's display screen, e.g. in the window of the user's web browser.

It is noted, however, that in alternative embodiments the remote computer may transform the user interface panel description(s) before sending the description(s) to the client computer. For example, the user interface panel(s) may be stored on the remote computer in a binary form, but may be translated into a text form, e.g., a markup language description, which the client computer is operable to process in order to display the panel(s) appropriately. Such an embodiment may advantageously enable client computers with different types of display devices, e.g., small screens included in various types of wireless devices, to easily interpret and display the user interface panel description(s) differently, depending on the capabilities of the particular display devices.

In step 460, the user's client software may receive data updates from the remote computer and update the user interface panel display accordingly. For example, as described above, the graphical program may be associated with measuring data from a live data source, and may be operable to display live data on the user interface panel continuously or periodically. Any of various data protocols may be used in transferring and displaying data updates.

The above description of step 460 pertains to an embodiment in which the user interface panel displayed on the client computer is "separated" from the actual data displayed in the panel. That is, the client computer may receive data to be displayed in the user interface panel independently of the panel description itself and may update the display of the panel according to the data, to reflect the output of the remote graphical program. In an alternative embodiment, the program output may be coupled with the panel description. For example, the panel description may be received as an image which reflects the program output. Thus, when receiving data updates, the client computer may receive an updated description of the user interface panel and may redisplay the updated panel.

In step 462, the user may operate the user interface panel, e.g. by performing a GUI-style point and click operation. The user's client software brokers this GUI operation to the remote computer 86. For example, as described above, the user's client software may communicate with a server-side agent, which may then forward the command to the remote graphical program. The remote graphical program then responds to the command accordingly. In many cases, the user's command in step 462 would cause the graphical program to change its output display, which would then be reflected on the user's display screen. In other words, in response to the user manipulating the inputs on the user interface displayed on the client computer 82, the user input is provided to the graphical program executing on the server computer 86, which may affect the displayed output of the graphical program. This displayed output is provided from the server computer 86 to be displayed on the user interface displayed on the client computer 82. The user may then provide other input to the graphical user interface, and so on. Thus, steps 460 and 462 may be performed in an iterative manner.

Data Socket

In an alternative embodiment, the DataSocket system and method, disclosed in U.S. patent application Ser. No. 09/185, 161, may be used to facilitate the communication between the user's client software and the remote computer running the graphical program. The DataSocket system comprises a client software component that addresses data sources/targets using a URL, much the way that a URL is used to address web pages anywhere in the world. When reading from an input source, the DataSocket performs all work necessary to read the raw data from various input sources and to parse the data and return it in a form directly usable by the user's applications. For example, with respect to one embodiment of the present invention, the DataSocket may be used to receive a description of the remote graphical program's user interface panel and broker this description to, for example, a web browser plug-in operable to display the user interface panel in a web browser window. Once the user interface panel is displayed, the DataSocket may then receive data updates from the remote graphical program, which are displayed in the user interface panel.

When writing to an output target the Data Socket performs all work necessary to format the data provided by the user into the appropriate raw format for the specific target. For example, with respect to one embodiment of the present invention, the DataSocket may marshal the user's input commands into an appropriate format and send them to the remote graphical program. For more information on the DataSocket system and method, please refer to the above-referenced patent application.

Receiving the Block Diagram of the Remote Graphical Program

In one embodiment, a user may also request and receive the remote graphical program's block diagram. The block diagram may be displayed as a simple, non-interactive image that may be useful, for example, for the user to understand how the graphical program is implemented. For example, the remote graphical program may execute within a graphical programming environment that provides an ability to programmatically edit the graphical program. Thus, the user may use the information gained from the display of the block diagram to remotely edit the graphical program. For more information on dynamically creating or editing a graphical program, please refer to the above-referenced patent application Ser. No. 09/518,492 titled, "System and Method for Programmatically Creating a Graphical Program".

In another embodiment, the client computer may receive and view the actual block diagram, thereby enabling the user to view and edit the block diagram, using software on the client computer. The user of the client computer may then transfer the edited block diagram back to the server computer.

In another embodiment, the user may interactively perform operations such as program debugging while the graphical program executes on the remote computer. The client software may communicate with the remote computer in order to specify debugging information, such as break points, and to control program execution, such as continuing execution from break points, etc. The client software may be operable to illustrate the operation of the remote graphical program in various ways, e.g., by using execution highlighting to update the block diagram appearance to show real-time execution or data flow, etc.

FIGS. 8A-10B: Exemplary Graphical Programs

FIGS. 8A-10B illustrate several exemplary graphical programs to which the present system and method may be applied. Each figure pair (A/B) illustrates a block diagram (B) for the program and an associated user interface panel (A). As described above, the graphical program may execute on one computer, while one or more end users remotely view or interact with the user interface panel of the graphical program from a different computer. Also, an end user may remotely view and/or edit the block diagram of the graphical program. Each graphical program example is briefly described below.

Figure 8A:
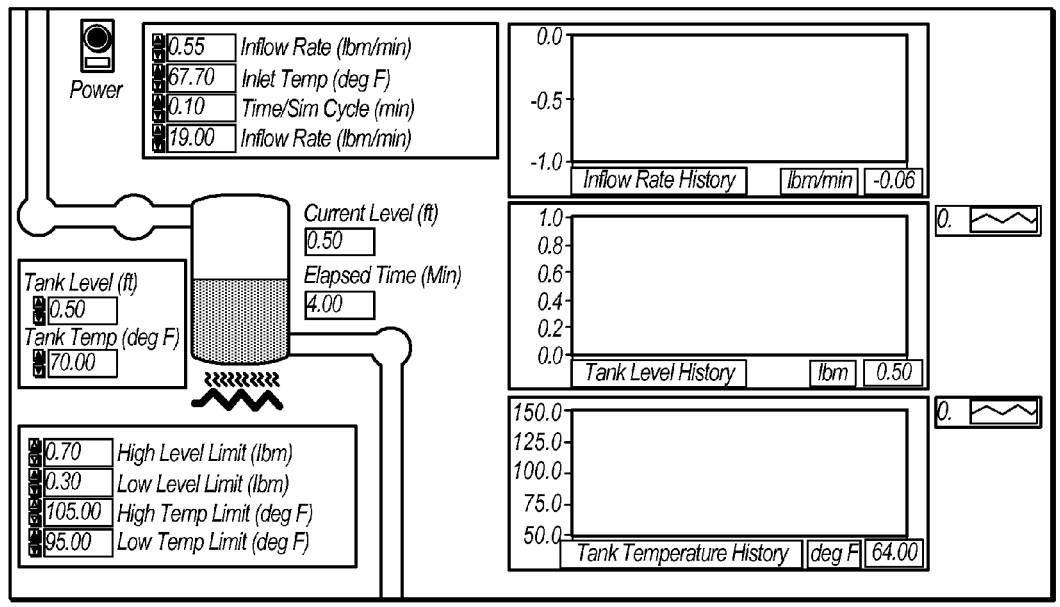
FIGS. 8A-10B illustrate exemplary graphical programs and their associated user interfaces.
Figure 8B:
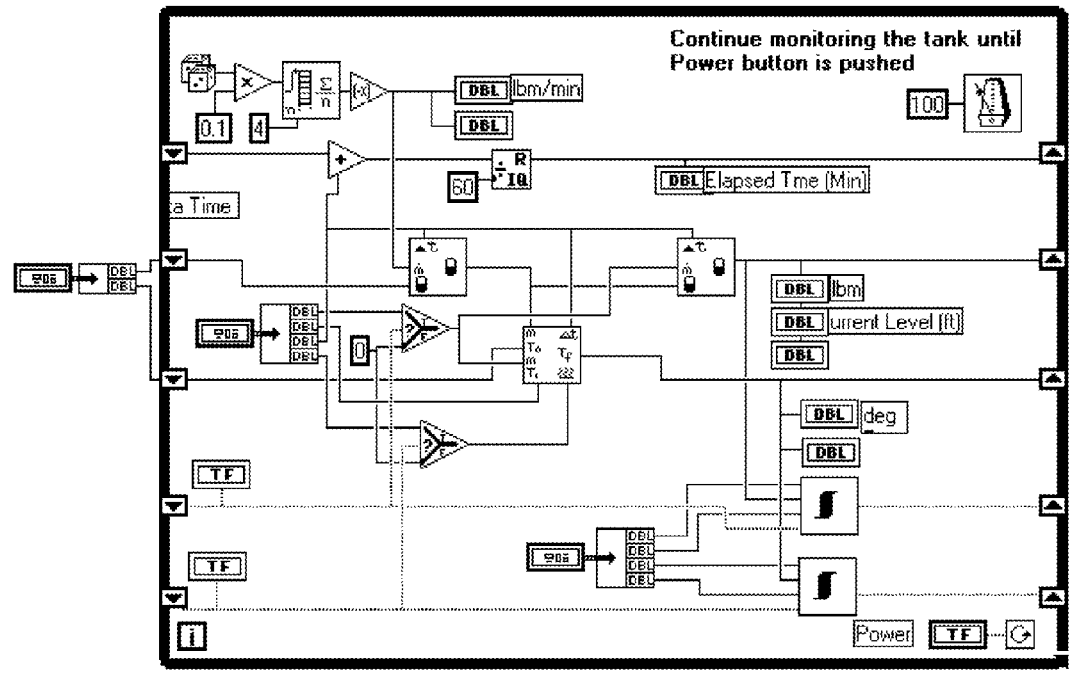

The block diagram shown in FIG. 8B simulates a tank control application. The associated user interface panel of FIG. 8A displays a history of inflow, level, and temperature for the tank control application.

Figure 9A:
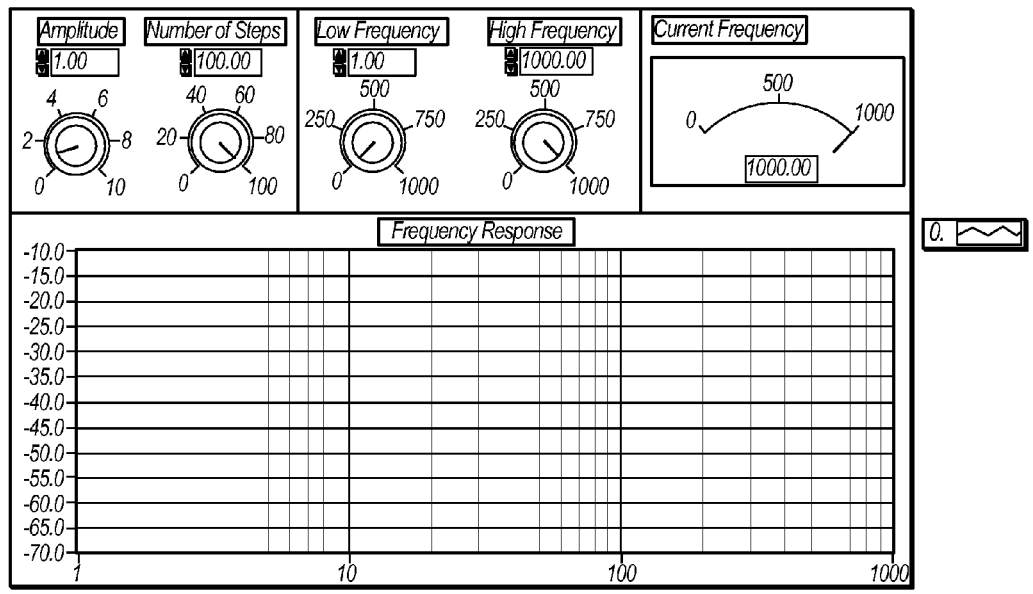
Figure 9B:
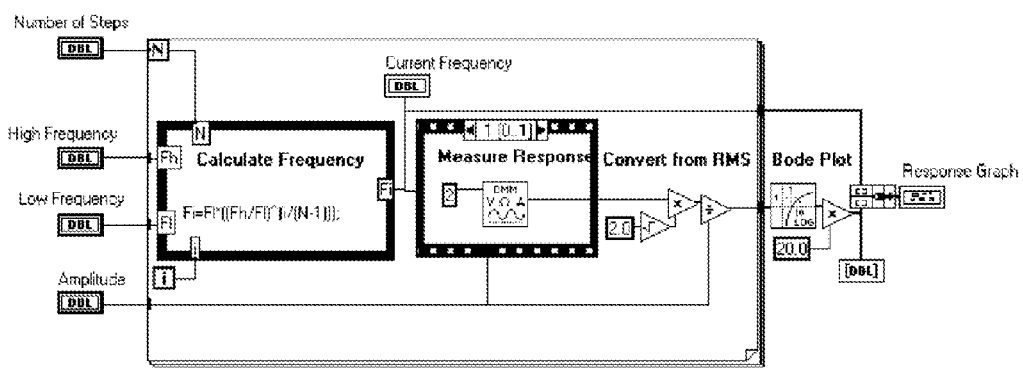

The block diagram shown in FIG. 9B simulates an application that uses GPIB instruments to perform a frequency response test on a unit under test (UUT). A function generator supplies a sinusoidal input to the UUT (a bandpass filter in this example), and a digital multimeter measures the output voltage of the UUT. The associated user interface panel of FIG. 9A displays respective controls for specifying attributes of the sinusoidal input, specifically, amplitude of the sine wave, labeled "amplitude", and number of steps, so labeled, specifying the number of frequency steps the function generator is to use in the sine wave sweep, as well as low and high frequency values specifying the frequency range of the sweep, also labeled accordingly. As may be seen, FIG. 9A also presents, a meter display is also provided for indicating the current frequency of the sinusoidal signal, labeled "Current Frequency". Finally, the user interface of this example embodiment includes a display area (bottom portion of FIG. 9A), referred to as a Response Graph, for displaying the frequency response of the UUT.

Figure 10A:
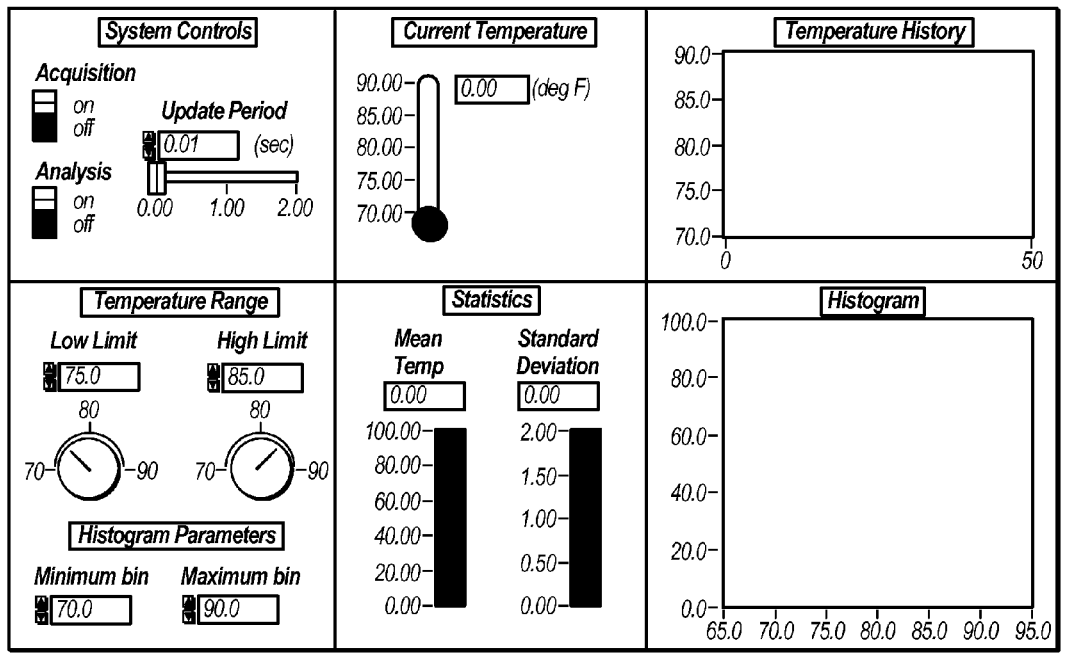
Figure 10B:
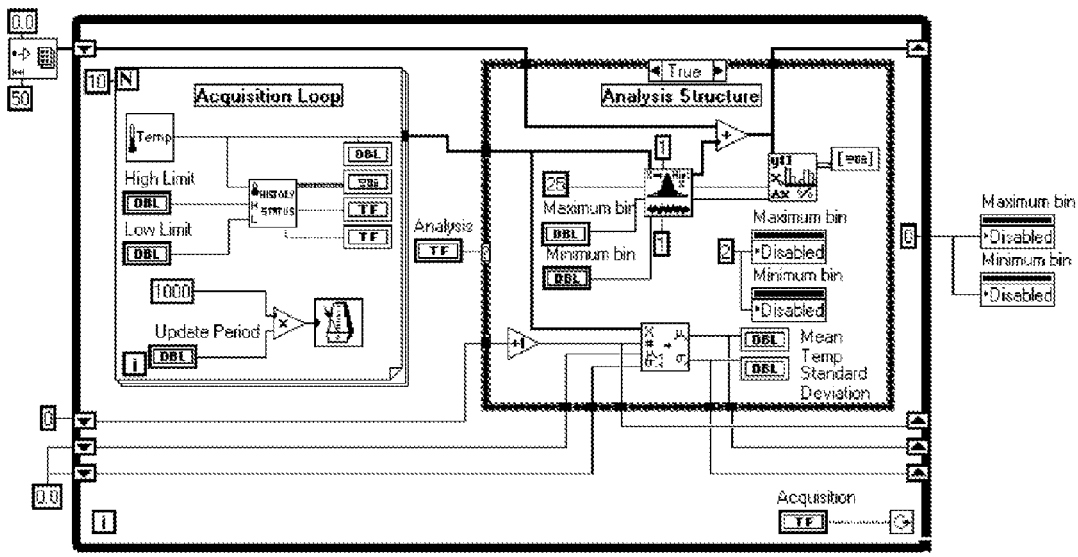

The block diagram shown in FIG. 10B simulates a temperature analysis application. This program reads a simulated temperature, sends an alarm if it is outside a given range, and determines a statistical mean, standard deviation, and histogram of the temperature history. The associated user interface panel of FIG. 10A displays various controls and indicators directed to respective aspects and results of the block diagram of FIG. 10B, specifically, (top left section) a control for starting and stopping data acquisition, labeled "Acquisition", a control for starting and stopping data analysis, labeled "Analysis", a control for specifying how often to take temperature readings, labeled "Update Period"; (middle left section) controls for setting low and high limits for the alarm, labeled "Low Limit" and "High Limit", respectively; (bottom left section) controls for specifying minimum and maximum temperature values to use in the histogram, labeled "Minimum bin" and "Maximum bin", respectively; (top middle section) a graphical current temperature indicator and numeric display, labeled "(deg F)"; (bottom middle section) graphical indicators and numeric displays for mean temperature and standard deviation, respectively, so labeled; (top right section) a graphical display for plotting a first temperature history; and (bottom right section) a graphical display for plotting a second temperature history.

The example graphical programs shown in FIGS. 8A-10B are directed toward instrumentation, industrial automation, or process control applications. The user interface panels for these programs include various controls or display readouts similar to what may appear on a hardware instrument or console. However, as discussed above, program developers and end users working in many different fields may benefit from the system and method described herein, to enable distributed display and/or control of a graphical program user interface for any of various types of applications.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A non-transitory computer accessible memory medium that stores program instructions executable to:

establish a network connection with a client computer system over a network;

receive user input from the client computer system indicating a graphical program for execution;

execute the graphical program, wherein the graphical program includes a block diagram that comprises a plurality of interconnected function icons representing graphical data flow of a desired function, wherein the plurality of interconnected function icons visually indicate functionality of the graphical program, and wherein said executing the graphical program comprises executing the plurality of interconnected function icons of the block diagram of the graphical program;

send information describing a user interface of the graphical program over the network to the client computer system after establishing the network connection with the client computer system, wherein the information describing the user interface of the graphical program is useable by the client computer system to display the user interface of the graphical program on the client computer system; and send information describing data updates of the block diagram of the graphical program over the network to the client computer system after establishing the network connection with the client computer system, wherein the information describing the data updates of the block diagram of the graphical program is useable by the client computer system to update the display of the block diagram of the graphical program on a display of the client computer system during said executing to reflect the execution of the graphical program in real-time;

wherein the user interface of the graphical program is operable to facilitate interaction between a user and the graphical program over the network.

2. The non-transitory computer accessible memory medium of claim 1, wherein the program instructions are further executable to:

provide information indicating a plurality of graphical programs to the client computer system over the network, wherein the information indicating a plurality of graphical programs is usable by the client computer system to display information indicating the plurality of graphical programs;

wherein, in indicating the graphical program for execution, the user input selects the graphical program from the plurality of graphical programs.

3. The non-transitory computer accessible memory medium of claim 1, wherein the program instructions are further executable to:

receive user input to the graphical program from the client computer system over the network; and provide the user input to the graphical program;

wherein the graphical program is operable to respond to the user input.

4. The non-transitory computer accessible memory medium of claim 1, wherein the graphical program produces a first output state; and wherein said sending information describing a user interface of the graphical program comprises sending information indicative of the first output state.

5. The non-transitory computer accessible memory medium of claim 4, wherein the graphical program produces a second output state after the graphical program produces the first output state; and wherein the program instructions are further executable to send a user interface update indicating the second output state to the client computer system.

6. The non-transitory computer accessible memory medium of claim 1, wherein the program instructions are further executable to:

establish a network connection with each of a plurality of client computer systems; and send information describing a user interface of the graphical program over the network to each of the plurality of client computer systems after establishing the network connection with each of the plurality of client computer systems.

7. The non-transitory computer accessible memory medium of claim 6, wherein the program instructions are further executable to:

send information describing the block diagram of the graphical program over the network to each of the plurality of client computer systems after establishing the network connection with each of the plurality of client computer systems, wherein the information describing the block diagram of the graphical program is useable by each of the plurality of client computer systems to display the block diagram of the graphical program.

8. The non-transitory computer accessible memory medium of claim 1, wherein the graphical program executes to perform a measurement or automation function.

9. The non-transitory computer accessible memory medium of claim 1, wherein the network is the Internet.

10. The non-transitory computer accessible memory medium of claim 1, wherein the information describing the user interface of the graphical program is useable by the client computer system to display the user interface of the graphical program on a web browser; and wherein the information describing the block diagram of the graphical program is useable by the client computer system to display the block diagram of the graphical program on the web browser.

11. The non-transitory computer accessible memory medium of claim 1, wherein the program instructions are further executable to:

receive user input specifying an edit to the block diagram of the graphical program from the client computer system over the network; and edit the block diagram of the graphical program according to the user input specifying the edit.

12. The non-transitory computer accessible memory medium of claim 1, wherein the user interface of the graphical program comprises at least one input variable icon for providing inputs to the block diagram of the graphical program and at least one output variable icon for displaying outputs produced by the block diagram of the graphical program.

13. The non-transitory computer accessible memory medium of claim 1, wherein the program instructions are further executable to:

receive input of at least one input variable from the client computer system over the network;

the block diagram of the graphical program executing using the input of the at least one input variable;

the block diagram of the graphical program generating an output of at least one output variable; and providing the output of the at least one output variable to the client computer system over the network for display.

14. The non-transitory computer accessible memory medium of claim 1, wherein the graphical program implements a virtual instrument; and wherein the user interface of the graphical program comprises a front panel of the virtual instrument.

15. A method for executing a graphical program on a first computer and providing a user interface of the graphical program for display on a second computer, the method comprising:

executing the graphical program on the first computer, wherein the graphical program includes a block diagram that comprises a plurality of interconnected function icons representing graphical data flow of a desired function, wherein the plurality of interconnected function icons visually indicate functionality of the graphical program, wherein the first computer and the second computer are connected over a network, and wherein said executing the graphical program comprises executing the plurality of interconnected function icons of the block diagram of the graphical program;

providing information describing the user interface of the graphical program to the second computer during said executing, wherein said providing comprises the first computer providing the information describing the user interface of the graphical program over the network to the second computer, and wherein the information describing the user interface of the graphical program is useable by the second computer to display the user interface of the graphical program on the second computer; and providing information describing data updates of the block diagram of the graphical program to the second computer over the network, wherein said providing comprises the first computer providing the information describing the data updates of the block diagram of the graphical program over the network to the second computer; and wherein the information describing the data updates of the block diagram of the graphical program is useable by the second computer to update the display of the block diagram of the graphical program on a display of the second computer during said executing to reflect the execution of the graphical program on the first computer in real-time;

wherein the user interface of the graphical program facilitates interaction between a user of the second computer and the graphical program executing on the first computer.

16. The method of claim 15, further comprising:
providing information describing the user interface of the graphical program to a plurality of computers over the network during said executing, wherein the information describing the user interface of the graphical program is useable by each of the plurality of computers to display the user interface of the graphical program.

17. The method of claim 15,
wherein the information describing the user interface of the graphical program is useable by the second computer to display the user interface of the graphical program on a web browser of the second computer; and
wherein the information describing the block diagram of the graphical program is useable by the second computer to display the block diagram of the graphical program on the web browser of the second computer.

18. The method of claim 15, further comprising:
the graphical program executing on the first computer responding to user input received to the graphical program via the user interface of the graphical program displayed on the second computer, wherein the user input is provided to the first computer over the network.

19. The method of claim 15, wherein the graphical program produces a second output state after the graphical program produces a first output state, the method further comprising:
providing a user interface update over the network indicating the second output state, wherein the user interface update is useable by the second computer to update the user interface of the graphical program displayed on the second computer.

20. The method of claim 15, further comprising:
receiving user input specifying an edit to the block diagram of the graphical program to the first computer from the second computer over the network; and
editing the block diagram of the graphical program according to the user input specifying the edit, wherein said editing is performed by the first computer.

21. The method of claim 15, wherein the user interface of the graphical program comprises at least one input variable icon for providing inputs to the block diagram of the graphical program and at least one output variable icon for displaying outputs produced by the block diagram of the graphical program, the method further comprising:
receiving input of at least one input variable to the first computer from the second computer over the network;
the block diagram of the graphical program executing using the input of the at least one input variable;
the block diagram of the graphical program generating an output of at least one output variable; and
providing the output of the at least one output variable to the second computer over the network, wherein the output is displayable on the second computer.

22. The method of claim 15,
wherein the graphical program implements a virtual instrument; and
wherein the user interface of the graphical program comprises a front panel of the virtual instrument.

23. A system for executing a graphical program, the system comprising:
a first computer, comprising:
a processor; and
a memory, coupled to the processor;
wherein the first computer is operable to couple to a network;
wherein the memory stores a graphical program, wherein the graphical program includes a block diagram that comprises a plurality of interconnected function icons representing graphical data flow of a desired function, and wherein the plurality of interconnected function icons visually indicate functionality of the graphical program;
wherein the first computer is operable to execute the graphical program and provide information describing a user interface of the graphical program over the network to a second computer during said executing, and wherein said executing the graphical program comprises executing the plurality of interconnected function icons of the block diagram of the graphical program;
wherein the information describing the user interface of the graphical program provided over the network is useable by the second computer to display the user interface of the graphical program;
wherein the user interface of the graphical program facilitates interaction between a user of the second computer and the graphical program executing on the first computer; and
wherein the first computer is operable to provide information describing data updates of the block diagram of the graphical program over the network to the second computer, and wherein the information describing the data updates of the block diagram of the graphical program is useable by the second computer to update the display of the block diagram of the graphical program on a display of the second computer during said executing to reflect the execution of the graphical program on the first computer in real-time.

24. A non-transitory computer accessible memory medium that stores program instructions executable to:
receive user input at a first computer indicating a graphical program, wherein the graphical program is stored on a server computer, wherein the graphical program includes a block diagram that comprises a plurality of interconnected function icons representing graphical data flow of a desired function, and wherein the plurality of interconnected function icons visually indicate functionality of the graphical program;

provide the user input indicating the graphical program over a network to the server computer;

receive information describing a user interface of the graphical program from the server computer over the network during execution of the graphical program on the server computer, wherein said execution of the graphical program comprises execution of the plurality of interconnected function icons of the block diagram of the graphical program;

receive information describing data updates of the block diagram of the graphical program from the server computer over the network;

display the user interface of the graphical program at the first computer based on the information describing the user interface of the graphical program; and display the block diagram of the graphical program at the first computer based on the information describing the data updates of the block diagram of the graphical program, including updating the display of the block diagram of the graphical program on a display of the first computer during said execution to reflect the execution of the graphical program on the server computer in real-time;

wherein the user interface of the graphical program facilitates interaction between a user and the graphical program executing on the server computer.

25. The non-transitory computer accessible memory medium of claim 24,
wherein the graphical program executes to perform a measurement or automation function.

26. The non-transitory computer accessible memory medium of claim 24, wherein the program instructions are further executable to:
establish a network connection with the server computer over the network after said receiving user input indicating the graphical program;
wherein said receiving information describing the user interface of the graphical program and said receiving information describing the block diagram of the graphical program are performed after said receiving user input indicating the graphical program and after said establishing a network connection.

27. The non-transitory computer accessible memory medium of claim 26,
wherein the graphical program is already executing on the server computer when said establishing a network connection occurs.

28. The non-transitory computer accessible memory medium of claim 24,
wherein to display the user interface of the graphical program, the program instructions are executable to display the user interface of the graphical program on a web browser.

29. The non-transitory computer accessible memory medium of claim 24, wherein the program instructions are further executable to:
receive user input to the graphical program via the displayed user interface of the graphical program; and
provide the user input to the server computer over the network for input to the graphical program executing on the server computer.

30. The non-transitory computer accessible memory medium of claim 24,
wherein the graphical program produces a first output state; and
wherein said displaying the user interface of the graphical program includes displaying the user interface of the graphical program illustrating the first output state.

31. The non-transitory computer accessible memory medium of claim 24, wherein the graphical program produces a second output state after the graphical program produces a first output state, and wherein the program instructions are further executable to:
receive a user interface update over the network indicating the second output state; and
update the user interface of the graphical program in response to the user interface update.

32. The non-transitory computer accessible memory medium of claim 24, wherein the program instructions are further executable to:
receive user input specifying an edit to the block diagram of the graphical program; and
provide the user input specifying the edit to the server computer over the network;
wherein the first computer is operable to edit the block diagram of the graphical program according to the user input specifying the edit.

33. The non-transitory computer accessible memory medium of claim 24,
wherein said indicating the graphical program comprises providing a uniform resource locator (URL).

34. The non-transitory computer accessible memory medium of claim 24, wherein the program instructions are further executable to:
display information indicating a plurality of graphical programs on the first computer;
wherein, in indicating the graphical program on the first computer, the user input selects the graphical program from the plurality of graphical programs.

35. The non-transitory computer accessible memory medium of claim 24,
wherein the user interface of the graphical program comprises at least one input variable icon for providing inputs to the block diagram of the graphical program and at least one output variable icon for displaying outputs produced by the block diagram of the graphical program.

36. The non-transitory computer accessible memory medium of claim 24, wherein the program instructions are further executable to:
receive user input manipulating input of at least one input variable;
provide the user input manipulating input of the at least one input variable to the server computer over the network;
receive output of at least one output variable from the server computer over the network, wherein the output is generated by the block diagram of the graphical program executing using the manipulated input of the at least one input variable; and
display the output of the at least one output variable.

37. The non-transitory computer accessible memory medium of claim 24,
wherein the graphical program implements a virtual instrument; and
wherein the user interface of the graphical program comprises a front panel of the virtual instrument.

38. A method for displaying a graphical user interface and block diagram of a graphical program on a second computer in response to execution of the graphical program on a first computer, the method comprising:
receiving user input to the second computer, wherein the user input indicates the graphical program on the first computer, wherein the graphical program includes a block diagram that comprises a plurality of interconnected function icons representing graphical data flow of a desired function, wherein the plurality of interconnected function icons visually indicate functionality of the graphical program, and wherein the first computer and the second computer are connected over a network;

receiving information describing a graphical user interface of the graphical program at the second computer from the first computer over the network during execution of the graphical program on the first computer, wherein said execution of the graphical program comprises execution of the plurality of interconnected function icons of the block diagram of the graphical program;

receiving information describing data updates of the block diagram of the graphical program at the second computer from the first computer over the network;

displaying the graphical user interface of the graphical program on the second computer based on the information describing the graphical user interface of the graphical program; and displaying the block diagram of the graphical program on a display of the second computer using the information describing the data updates of the block diagram of the graphical program, including updating the display of the block diagram of the graphical program during said execution to reflect the execution of the graphical program on the first computer in real-time;

wherein the graphical user interface of the graphical program facilitates interaction between a user of the second computer and the graphical program executing on the first computer.

39. The method of claim 38, further comprising:
establishing a network connection with the first computer over the network after said receiving user input indicating the graphical program;
wherein said receiving information describing the graphical user interface of the graphical program and said receiving information describing the block diagram of the graphical program are performed after said receiving user input indicating the graphical program and after said establishing a network connection.

40. The method of claim 38,
wherein said displaying the graphical user interface of the graphical program comprises displaying the graphical user interface of the graphical program on a web browser.

41. The method of claim 38, further comprising:
receiving user input to the graphical program via the displayed graphical user interface of the graphical program; and
providing the user input to the first computer over the network for input to the graphical program executing on the first computer.

42. The method of claim 38, further comprising:
receiving user input specifying an edit to the block diagram of the graphical program; and
providing the user input specifying the edit to the first computer over the network;
wherein the user input specifying the edit is useable by the first computer to edit the graphical program.

43. The method of claim 38,
wherein the graphical user interface of the graphical program comprises at least one input variable icon for providing inputs to the block diagram of the graphical program and at least one output variable icon for displaying outputs produced by the block diagram of the graphical program.

44. The method of claim 38, further comprising:
receiving user input manipulating input of at least one input variable;
providing the user input manipulating input of the at least one input variable to the first computer over the network;
receiving output of at least one output variable from the first computer, wherein the output is generated by the block diagram of the graphical program executing using the manipulated input of the at least one input variable; and
displaying the output of the at least one output variable on the second computer.

45. The method of claim 38,
wherein the graphical program implements a virtual instrument; and
wherein the graphical user interface of the graphical program comprises a front panel of the virtual instrument.

46. A system, comprising:
a processor;
a memory, coupled to the processor; and
a network port operable to couple to a network;
wherein the memory stores program instructions executable by the processor to:
receive user input specifying a graphical program, wherein the graphical program includes a block diagram that comprises a plurality of interconnected function icons representing graphical data flow of a desired function, and wherein the plurality of interconnected function icons visually indicate functionality of the graphical program;
provide the user input specifying the graphical program over a network to a server computer;
receive information describing a user interface of the graphical program from the server computer over the network during execution of the graphical program on the server computer, wherein said execution of the graphical program comprises execution of the plurality of interconnected function icons of the block diagram of the graphical program;
receive information describing data updates of the block diagram of the graphical program from the server computer over the network;
display the user interface of the graphical program based on the information describing the user interface of the graphical program; and display the block diagram of the graphical program on a display based on the information describing the data updates of the block diagram of the graphical program, including updating the display of the block diagram of the graphical program during said execution to reflect the execution of the graphical program on the server computer in real-time;
wherein the user interface of the graphical program facilitates interaction between a user and the graphical program executing on the server computer.

* * * * *